(12) United States Patent
Meir et al.

(10) Patent No.: US 11,360,683 B1
(45) Date of Patent: Jun. 14, 2022

(54) LOGICAL RAID

(71) Applicant: Pliops Ltd., Tel Aviv (IL)

(72) Inventors: Avraham Meir, Rishon Le zion (IL);
Moshe Twitto, Givat Shemuel (IL)

(*) Notice: Subject to any disclaimer, the term of this patent is extended or adjusted under 35 U.S.C. 154(b) by 0 days.

(21) Appl. No.: 16/941,453

(22) Filed: Jul. 28, 2020

Related U.S. Application Data

(60) Provisional application No. 62/830,376, filed on Apr. 6, 2019.

(51) Int. Cl.
*G06F 3/06* (2006.01)

(52) U.S. Cl.
CPC ............ *G06F 3/0644* (2013.01); *G06F 3/06* (2013.01); *G06F 3/0619* (2013.01); *G06F 3/0659* (2013.01); *G06F 3/0673* (2013.01); *G06F 3/0689* (2013.01)

(58) Field of Classification Search
CPC ........ G06F 3/0644; G06F 3/06; G06F 3/0689; G06F 3/0619; G06F 3/0659; G06F 3/0673
See application file for complete search history.

(56) References Cited

U.S. PATENT DOCUMENTS

| | | | | |
|---|---|---|---|---|
| 2017/0315888 A1* | 11/2017 | Blount | ............... | H04L 67/1097 |
| 2017/0357683 A1* | 12/2017 | Bumbulis | ........... | G06F 11/1471 |
| 2019/0087268 A1* | 3/2019 | Koltsidas | .............. | G06F 3/0689 |
| 2019/0303468 A1* | 10/2019 | Park | ..................... | G06F 16/2255 |
| 2021/0109925 A1* | 4/2021 | Isomura | ............. | G06F 16/9537 |

* cited by examiner

*Primary Examiner* — Sean D Rossiter
(74) *Attorney, Agent, or Firm* — Reches Patents

(57) ABSTRACT

A method for protecting objects, the method may include receiving, by a storage controller, a request to write a new object to a storage-system that may include multiple nodes, each node may include at least one storage element; the new object may include a key value pair; writing the new object to a target node and to another node of the multiple nodes; and generating a new stripe that may include multiple sets of objects, different sets of objects are stored at different nodes of the multiple nodes, a certain set of objects of the multiple sets of objects may include the new object and is stored in a first node of the target node and the other node, any set of objects of the multiple sets of objects is reconstructible using other sets of objects of the multiple set of objects.

19 Claims, 6 Drawing Sheets

US 11,360,683 B1

LOGICAL RAID

CROSS REFERENCE

This application claims priority from U.S. provisional patent Ser. No. 62/830,376, filing date Apr. 6, 2019 which is incorporated herein by reference.

BACKGROUND

There is a growing need to protect data stored in storage systems in an effective manner.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
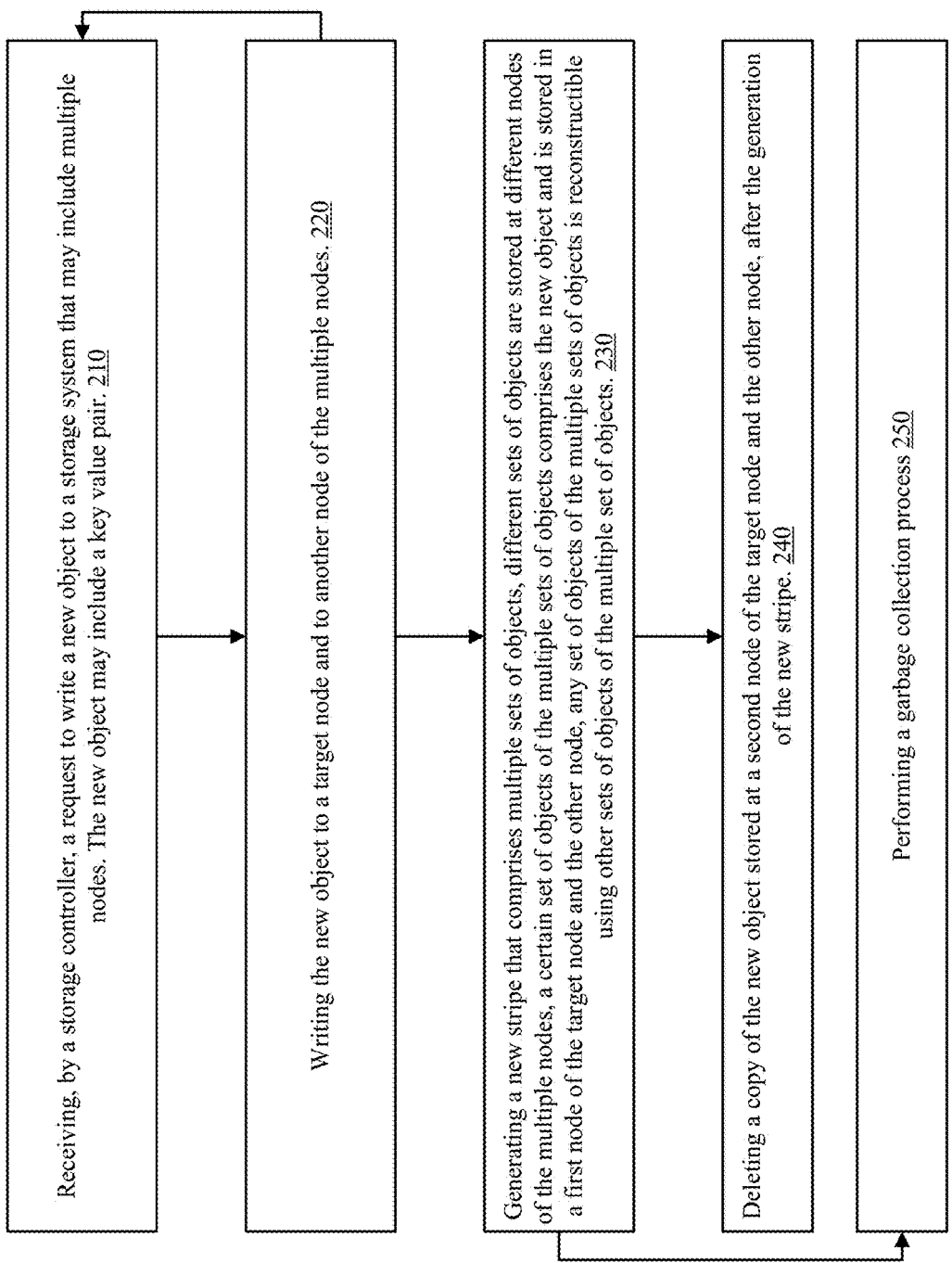
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Redundant array of independent disks (RAID) is a data storage virtualization technology that combines multiple physical disk drive components into one or more logical units for the purposes of data redundancy. The data is arranged in fixed size units, and the redundancy information is stored in known addresses.

Solid state drive (SSD) may store key value pairs (also referred to as objects). The "key" is the name of the name and the value is the associated data. The key & value pairs may be of a variable size.

Due to the variable size of the objects—applying a RAID type protection that is tailored to fixed size units and to fixed addresses of redundancy information to the variable key value pairs will fail.

There is provided a method, a non-transitory computer readable medium and a system for applying RAID type protection to SSD arrays that stores kay value pairs.

Node: It is storage building block. It can be a single storage-die, a multi-die package, a drive, or even server with multiple drives. In the described innovation node use to store multiple objects. Node has probability to fail. The described innovation provides method to recover data when nodes fail.

Stripe: It is logical group of objects, spans over multiple nodes. Each stripe contains redundant data. The redundant data is located in some of the nodes. Using the redundancy the stripe data recovered when some of the nodes fail.

Multiple stripes are defines. Each stripe includes multiple sets of objects. Each set may include one or more objects. Different sets of objects are stored in different nodes.

A node may allocate a fixed size space for storing a set of objects of a single stripe.

The objects of a stripe may be data objects or parity objects.

A set of objects of a certain stripe may be recovered using other set of objects of the certain stripe.

A stripe may include a stripe descriptor or may be otherwise associated with a stripe descriptor.

The stripe descriptor may be replicated (to provide redundancy). The stripe descriptor may be duplicated at different nodes and may also be duplicated to a random access memory that may be accessed by an storage-controller.

A stripe descriptor may store information about the objects included in the stripe and may include, for example—the order of objects, which nodes store the objects and may include object size metadata indicative of the size of the objects.

There may also be provided object metadata such as sharding metadata and stripe retrieval metadata. The sharding metadata provides information regarding an alternate disk in which an object may be written—in case that a target node that stored the object failed. The stripe retrieval metadata allows to retrieve a stripe that includes the object during a reconstruction process of a stripe. The stripe retrieval metadata may include a location of the stripe or any other metadata required to retrieve the stripe.

A new stripe may be generating following a trigger. The trigger may be, for example, an accumulation of at least a predefined number of objects that were not yet included in a stripe.

Once a new object is received—and before it is included in a stripe—the object is duplicated and stored at different nodes. The target node (node that should receive the new object) may be selected in any manner—for example based on the key, by applying a hash function on the key, by distributing the objects in any manner, by applying load balancing between the nodes, or by applying any distribution process.

The new object may be duplicated to at least one other node. The identity of the at least one other node may be determined based on the identity of the target node. For example—a mapping may link each node to one or other node.

Once the new object is included in a stripe—the duplicate copy may be deleted.

A garbage collection may be provided in which new stripes are generated. The objects may maintain at the same physical location—but the metadata may be changed.

The objects of a stripe may be of various types—to be deleted object, a moved object (object associated with a multiple stripes), and a regular object associated with a single stripe.

A "to be deleted object" may be an object that should be deleted—but its actual deletion waits until the entire stripe that includes the object is deleted. The delay in the deletion is required for maintaining the recovery ability of the stripe.

Each stipe includes multiple data objects and some dedicated parity objects. Each data object fits (size wise) to single node.

Write Process
a. Receive new object.
b. Replicate value of the new object.
c. Replicate key of the object and optionally store in a separate location than the value.
d. Generate and replicate object metadata.
    Garbage Collection (GC) Process
a. Select a new stripe that is empty.
b. Associate with the new stripe, objects from an old stripe which has the smallest amount of valid data. Invalid object may be deleted after the old stripe is empty—does not include any valid objects.
c. Associate with the new stripe, new data (data that is currently not included in any stripe) or data from other old stripes.
d. Calculate new stripe parity and store it in the relevant node.
e. New Stripe is complete and valid.
f. Update object-metadata of objects associated with the new stripe. To allow their retrieval from the new stripe.
g. Update all stripe-descriptors that were involved in this GC process.
h. Delete invalid objects including parity-objects of old stripes.
i. Throughout the whole process, Short-Time-To-Live attribute may be attached to frequently updated objects.

Regular Read—using sharding logic—select the correct node and read the object. For example apply a has function on the key.

Delete/Erase:
a. Update the stripe descriptor to indicate object invalidity. When the whole stripe becomes invalid, through garbage collection process, the object is deleted from the drive.
b. Read with recovery may involve reading metadata and identify the relevant stripe. Read stripe descriptor Recover the stripe.
c. Return read value to reader.
d. Re-write the recovered stripe.

When using said mentioned above method—data may not be copied during compaction/GC process, only metadata and parity are updated. This results in smaller write amplification and in significant saving in compute and endurance.

When using said mentioned above method—the interface to the storage-system may be a key value interface—that may exhibit low read latency and lower write amplification.

FIG. 1 illustrates method 200

A method for protecting objects.

Method 200 may start by step 210 of receiving, by storage controller (may be a SSD memory controller), a request to write a new object to a storage system (such as but not limited to as SSD memory device) that includes multiple nodes, each node may include at least one SSD memory chip—or non-SSD memory chip. The new object may include a key value pair.

Step 210 may be followed by step 220 of writing the new object to a target node and to another node of the multiple nodes.

Multiple repetitions of steps 210 and 220 may be followed by step 230 of generating a new stripe that comprises multiple sets of objects, different sets of objects are stored at different nodes of the multiple nodes, a certain set of objects of the multiple sets of objects comprises the new object and is stored in a first node of the target node and the other node, any set of objects of the multiple sets of objects is reconstructible using other sets of objects of the multiple set of objects.

Step 230 may be followed by step 240 of deleting a copy of the new object stored at a second node of the target node and the other node, after the generation of the new stripe.

Step 220 may include selecting the target node and the other node.

The selecting of the target node may include applying a hash function on the new key. This may be followed a modulo operation for mapping hash results to one of the nodes.

The selecting of the other node may be based on a mapping between the target node and the other node.

Step 230 may include generating a stripe descriptor and storing the stripe descriptor in a plurality of nodes.

The stripe descriptor may include metadata regarding information about objects included in the stripe.

The stripe descriptor may include metadata about an order of objects of the stripe, nodes that store the objects of the stripe, and object size metadata indicative of sizes of the objects.

The method may include generating object metadata that may include sharding metadata and stripe retrieval metadata.

The sharding metadata provides information regarding an alternate disk in which an object may be expected to be written, in case that a target node that stores the object failed.

The stripe retrieval metadata may be for retrieving the new stripe during a reconstruction process of the new stripe.

The method may include receiving a request to read the new object, and providing the new object from the certain set of objects stored at the first node.

The providing may include using object metadata that may include sharding metadata and stripe retrieval metadata.

The method may include receiving a request to read the new object, accessing the first node, finding that the first node failed, and reconstructing the new stripe.

The method may include step 250 of performing a garbage collection process.

Figure 2:
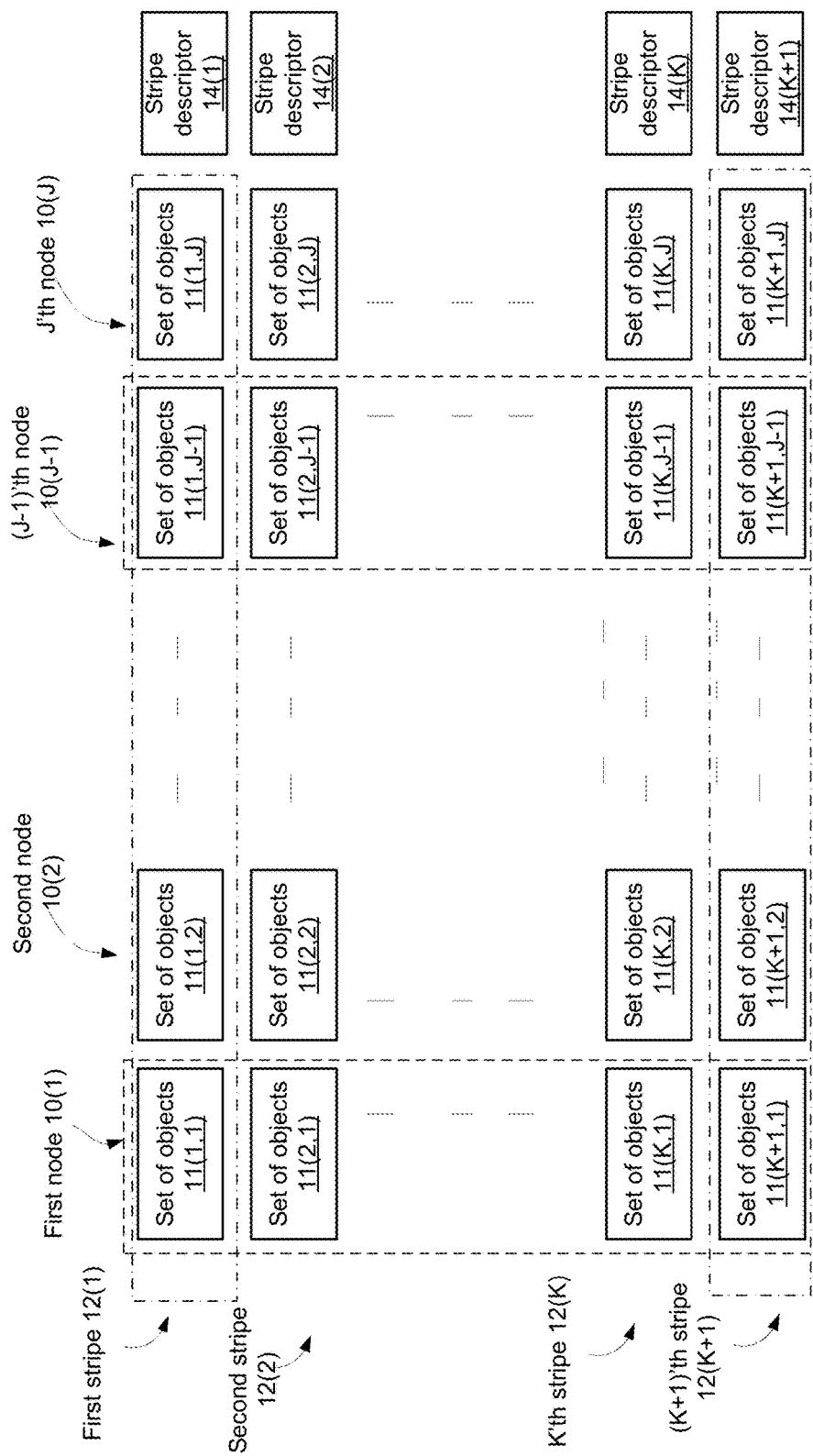
FIGS. 2-4 illustrate examples of nodes, stripes and stripe descriptors.
Figure 3:
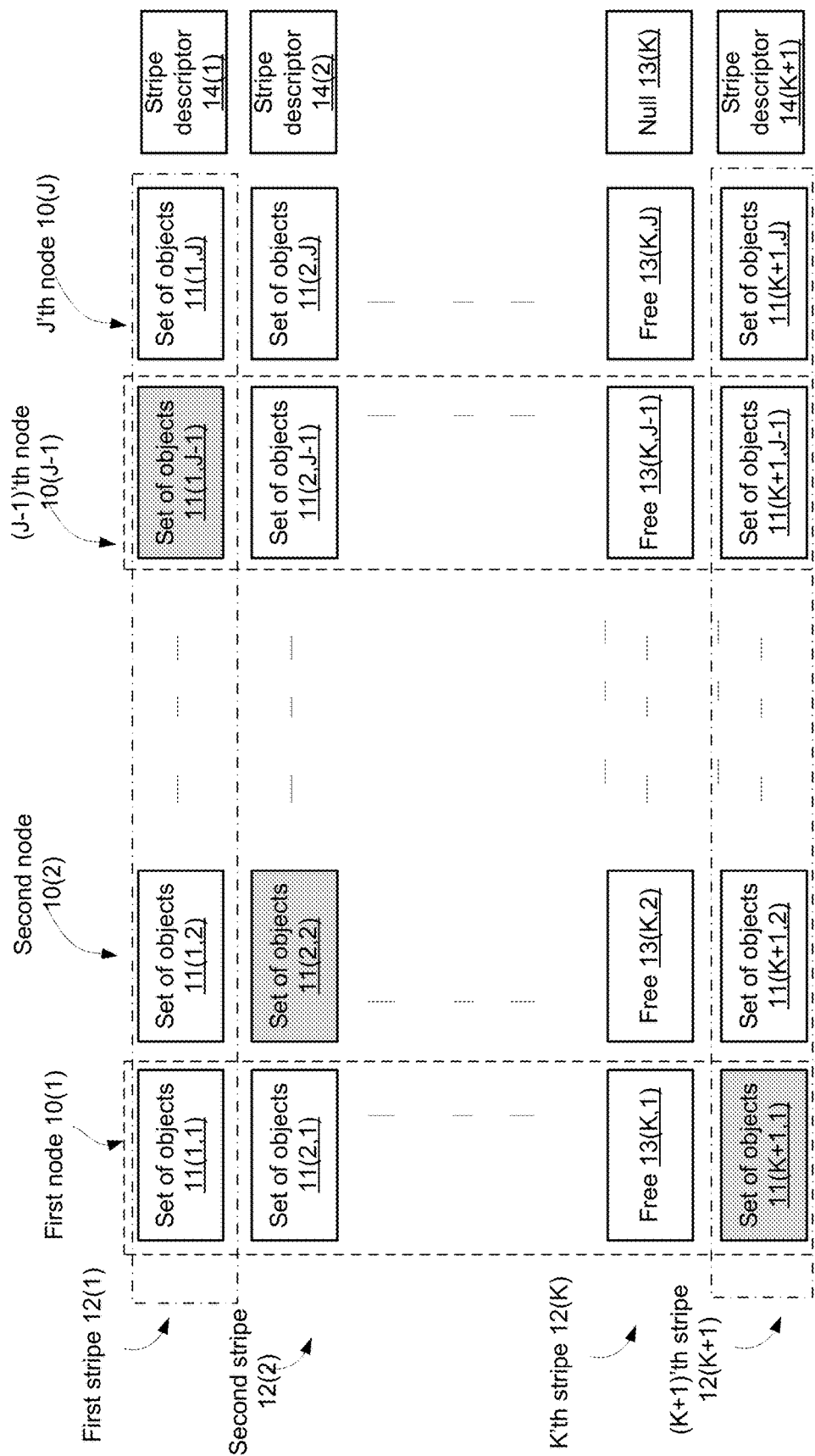
Figure 4:
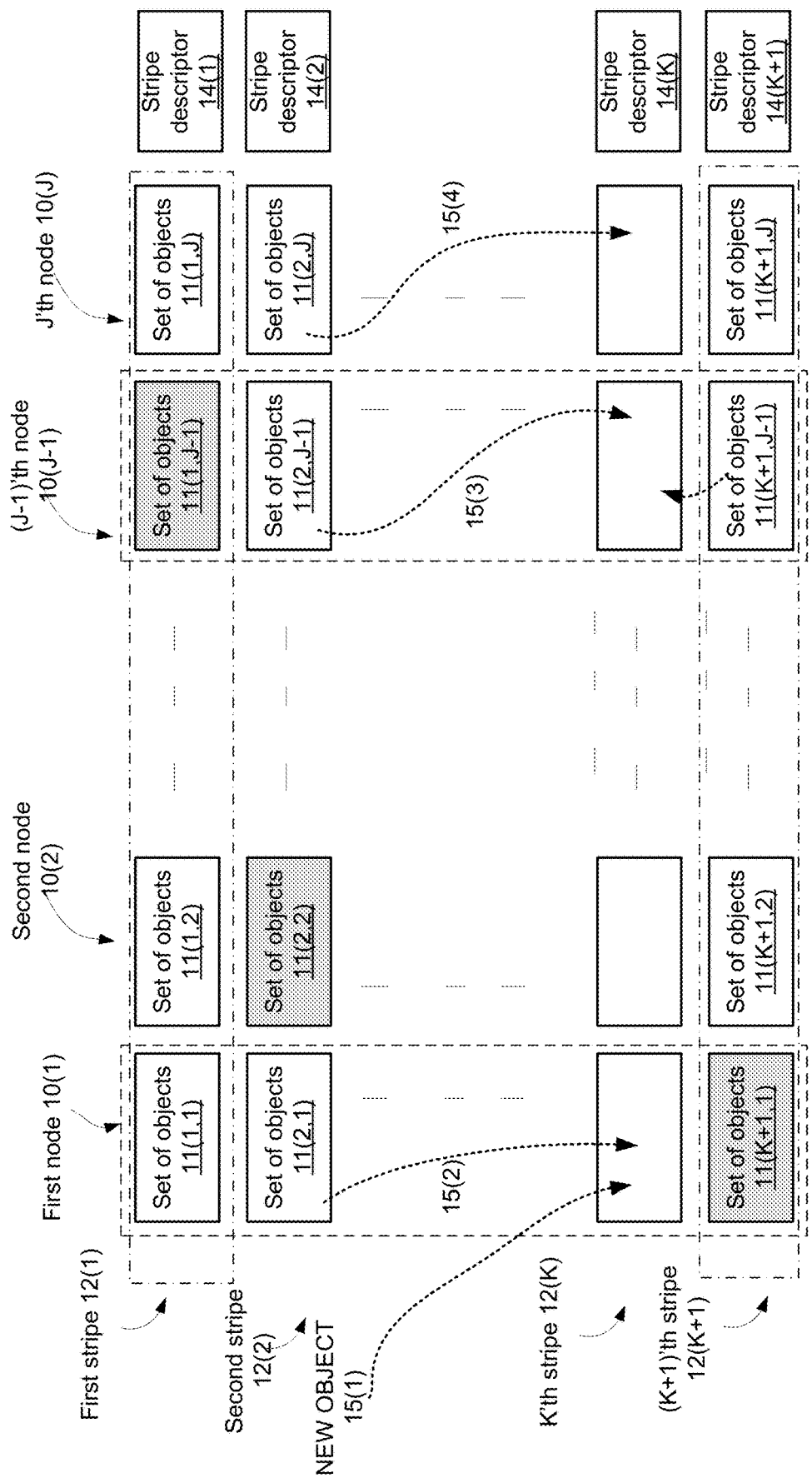

FIGS. 2-4 illustrates J'th nodes (10(1)-10(J)), K+1 stripes (12(1)-12(K+1)) and stripe descriptors 14(1)-14(K+1).

The stripes include set of objects 11(1,1)-11(K+1,J). K and J are positive integers. K may be equal to J or may differ from J. The set of objects may be sets of data objects or sets of parity objects.

In FIG. 3 the parity objects are illustrated as having a gray background (11(1,J−1), 11(2,2). 11(K+1,1)), and the Kt'h stripe is empty—see free spaces 13(K,1)-13(K) associated with a null 13(K) stripe descriptor.

In FIG. 4 the previously empty stripe 12(k) is being filled with objects from other stripes and by a new object (that does not belong to any stripe—see dashed arrows 15(1)-15(4).

Figure 5:
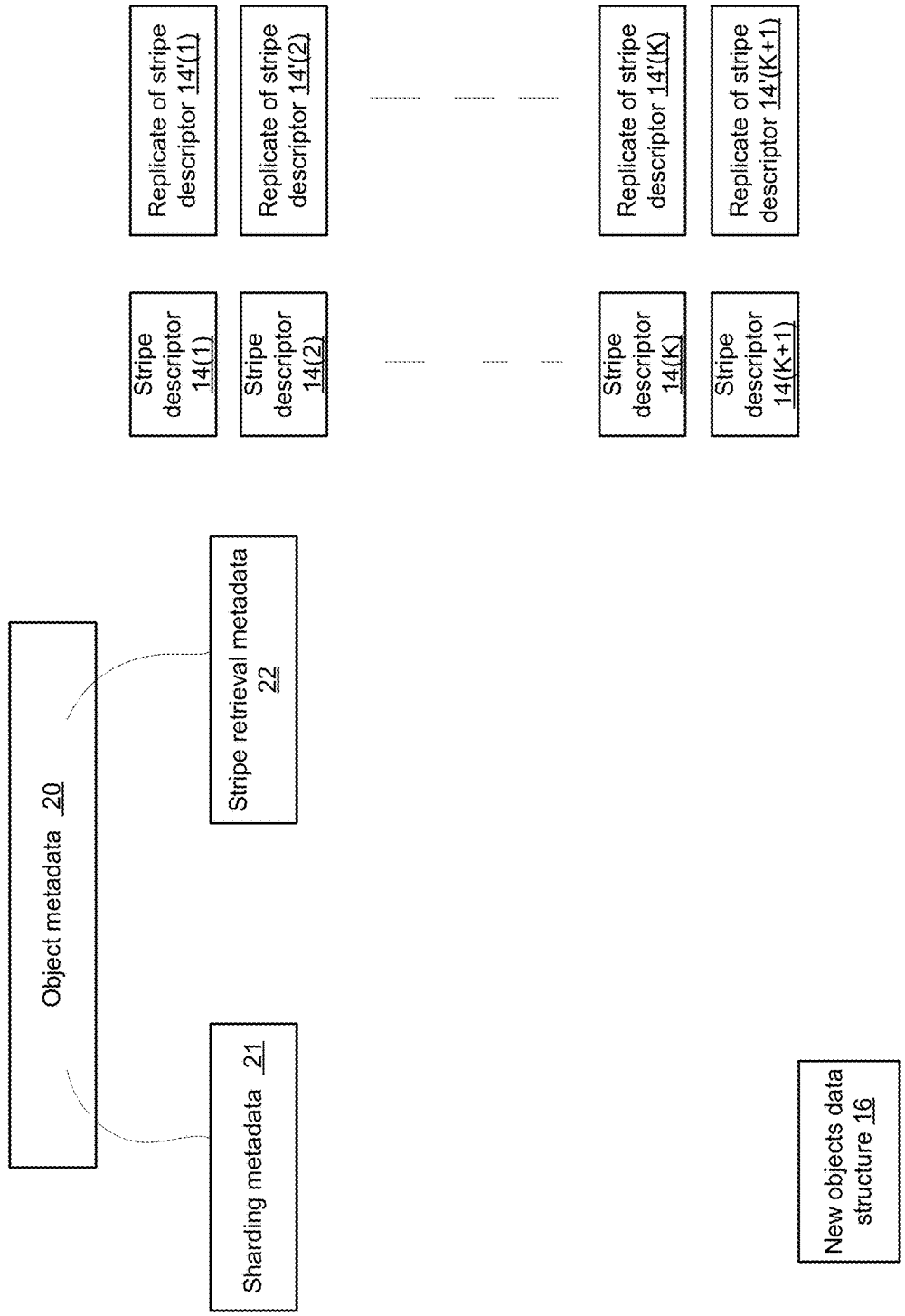
FIG. 5 illustrates various fields and metadata.

FIG. 5 illustrates various fields and metadata—such as object metadata 20 (includes sharding metadata 21 and stripe retrieval metadata 22), stripe descriptors 14(1)-14(K) and duplicates 14(1)-14'(K), and new objects data structure 16—that stores the new objects received by the SSD memory and not stored yet in a stripe. An object data structure may be provided per node.

Figure 6:
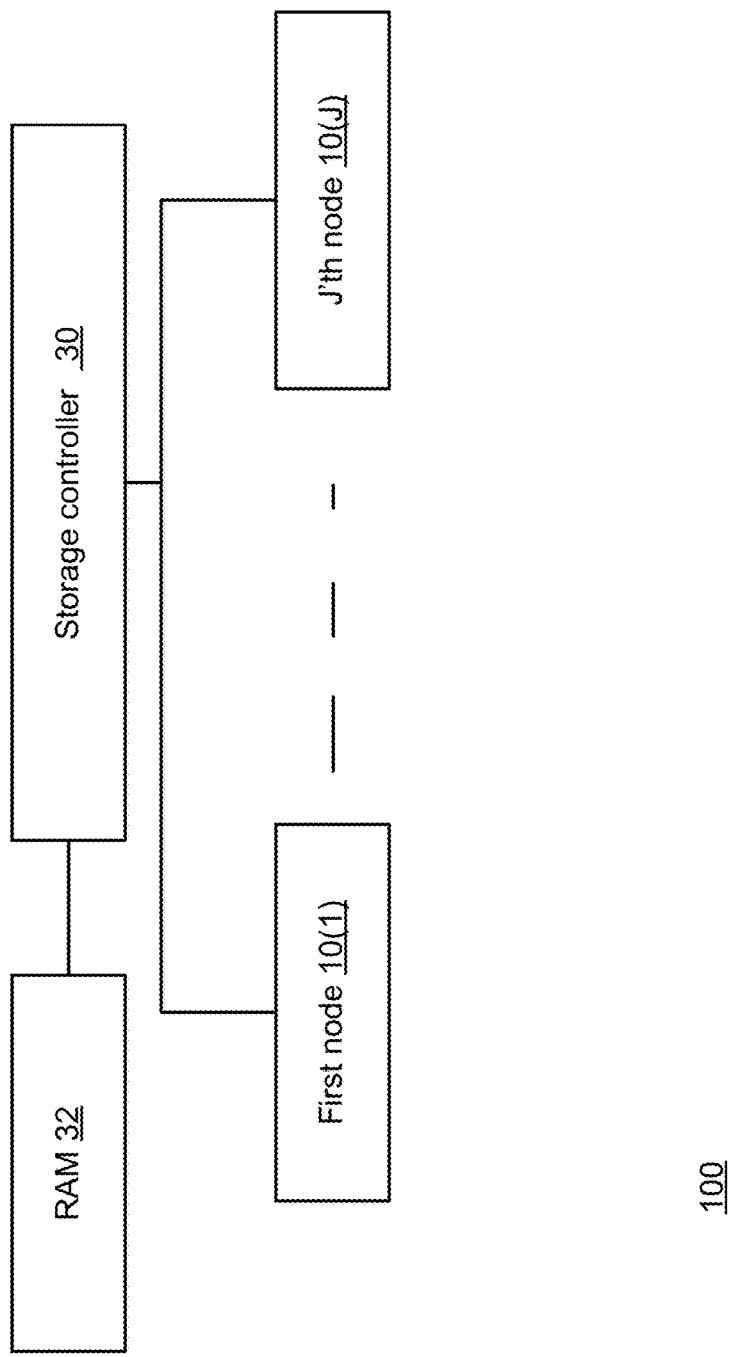
FIG. 6 illustrates an example of a method.

FIG. 6 illustrates an example of system 100 that includes SSD controller 30, RAM memory 32 and nodes 10(1)-10(J). Various fields and metadata may be stored in at least one of RAM memory 32 and one or more nodes.

Yet according to another embodiment there may be provided a method, system and non-transitory computer readable medium for (a) calculating a hash value of the key—whereas some bits (for example LSB) define the drive and some other bits define the stripe.

When a new object is being written—the method will read an old object, write the new object on a default drive and update the parity on the parity drive—which may be related to RAID 5.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for protecting objects, the method comprises:
receiving, by a solid state drive (SSD) storage controller, a request to write a new object to a storage-system that comprises multiple SSD nodes, each SSD node comprises at least one storage element; the new object comprises a key value pair;
writing the new object to a target SSD node and to another SSD node of the multiple SSD nodes;
generating a new stripe that comprises multiple sets of objects, different sets of objects are stored at different SSD nodes of the multiple SSD nodes, a certain set of objects of the multiple sets of objects comprises the new object and is stored in a first SSD node of the target SSD node and the other SSD node, any set of objects of the multiple sets of objects is reconstructible using other sets of objects of the multiple set of objects; and
generating a stripe descriptor for the new stripe and storing the stripe descriptor and duplicates of the stripe descriptor in a plurality of SSD nodes and in a random access memory that is accessible to the SSD storage controller.

2. The method according to claim 1 comprising storing a copy of the new object in a new objects data structure stored of a SSD memory before being included in the new stripe; and deleting the copy of the new object after the generating of the new stripe.

3. The method according to claim 1 comprising selecting the target SSD node and the other SSD node.

4. The method according to claim 3 comprising selecting the target SSD node by applying a hash function on the new key.

5. The method according to claim 3 comprising selecting the other SSD node based on a mapping between the target SSD node and the other SSD node.

6. The method according to claim 1 wherein the new stripe comprises an object that has its deletion delayed for maintaining a recovery ability of the new stripe.

7. The method according to claim 1 wherein the stripe descriptor comprises metadata regarding information about objects included in the stripe.

8. The method according to claim 7 wherein the stripe descriptor comprises metadata about an order of objects of the stripe, SSD nodes that store the objects of the stripe, and object size metadata indicative of sizes of the objects.

9. The method according to claim 1 comprising generating object metadata that comprises sharding metadata and stripe retrieval metadata.

10. The method according to claim 9 wherein the sharding metadata provides information regarding an alternate disk in which an object is expected to be written, in case that a target SSD node that stores the object failed.

11. The method according to claim 9 wherein the stripe retrieval metadata is for retrieving the new stripe during a reconstruction process of the new stripe.

12. The method according to claim 1 comprising receiving a request to read the new object, and providing the new object from the certain set of objects stored at the first SSD node.

13. The method according to claim 12 wherein the providing comprises using object metadata that comprises sharding metadata and stripe retrieval metadata.

14. The method according to claim 1 comprising receiving a request to read the new object, accessing the first SSD node, finding that the first SSD node failed, and reconstructing the data from its stripe.

15. The method according to claim 1 further comprising performing a garbage collection process.

16. A system comprising a solid state drive (SSD) storage controller, the SSD storage controller is configured to:
receive a request to write a new object to a storage system that comprises multiple SSD nodes, each SSD node comprises at least one storage-element; the new object comprises a key value pair;
write the new object to a target SSD node and to another SSD node of the multiple SSD nodes; and generating a new stripe that comprises multiple sets of objects, different sets of objects are stored at different SSD nodes of the multiple SSD nodes, a certain set of objects of the multiple sets of objects comprises the new object and is stored in a first SSD node of the target SSD node and the other SSD node, any set of objects of the multiple sets of objects is reconstructible using other sets of objects of the multiple set of objects; and
generate a stripe descriptor for the new stripe and storing the stripe descriptor and duplicates of the stripe descriptor in a plurality of SSD nodes and in a random access memory that is accessible to the SSD storage controller.

17. The system according to claim 16 wherein the new stripe comprises an object that has its deletion delayed for maintaining a recovery ability of the new stripe.

18. A non-transitory computer program product that stores instructions for:
receiving, by solid state drive (SSD) storage controller, a request to write a new object to storage-system that comprises multiple SSD nodes, each SSD node comprises at least storage-element-; the new object comprises a key value pair;
writing the new object to a target SSD node and to another SSD node of the multiple SSD nodes; and generating a new stripe that comprises multiple sets of objects, different sets of objects are stored at different SSD nodes of the multiple nodes, a certain set of objects of the multiple sets of objects comprises the new object and is stored in a first SSD node of the target SSD node and the other SSD node, any set of objects of the multiple sets of objects is reconstructible using other sets of objects of the multiple set of objects; and
generating a stripe descriptor for the new stripe and storing the stripe descriptor and duplicates of the stripe descriptor in a plurality of SSD nodes and in a random access memory that is accessible to the SSD storage controller.

19. The non-transitory computer program product according to claim 18 wherein the new stripe comprises an object that has its deletion delayed for maintaining a recovery ability of the new stripe.

* * * * *